(12) United States Patent
Xiao et al.

(10) Patent No.: US 12,322,080 B2
(45) Date of Patent: Jun. 3, 2025

(54) DUAL-NEIGHBORHOOD WEAR ANGLE AUTOMATIC DETECTION METHOD

(71) Applicant: CHANG'AN UNIVERSITY, Shaanxi (CN)

(72) Inventors: Mei Xiao, Shaanxi (CN); Lei Zhang, Shaanxi (CN); Bing Yang, Shaanxi (CN); Kairui Du, Shaanxi (CN); Ting Xu, Shaanxi (CN)

(73) Assignee: CHANG'AN UNIVERSITY, Shaanxi (CN)

( * ) Notice: Subject to any disclaimer, the term of this patent is extended or adjusted under 35 U.S.C. 154(b) by 487 days.

(21) Appl. No.: 17/727,469

(22) Filed: Apr. 22, 2022

(65) Prior Publication Data

US 2022/0245789 A1    Aug. 4, 2022

Related U.S. Application Data

(63) Continuation of application No. PCT/CN2021/071221, filed on Jan. 12, 2021.

(30) Foreign Application Priority Data

Feb. 26, 2020  (CN) .......................... 202010121606.6

(51) Int. Cl.
   *G06T 7/00*   (2017.01)
(52) U.S. Cl.
   CPC .. *G06T 7/0004* (2013.01); *G06T 2207/10061* (2013.01)

(58) Field of Classification Search
   CPC ............. G06T 7/40; G06T 2207/30136; G06T 7/0004; G06T 2207/30108; G06T 7/60–62; G06T 2207/10061
   See application file for complete search history.

(56) References Cited

U.S. PATENT DOCUMENTS

| | | |
|---|---|---|
| 5,881,167 A | 3/1999 | Takano et al. |
| 2010/0092069 A1* | 4/2010 | Asada ................ G01N 21/8851 |
| | | 382/141 |
| 2016/0098828 A1 | 4/2016 | Ito et al. |

FOREIGN PATENT DOCUMENTS

| | | |
|---|---|---|
| CN | 103712565 | 4/2014 |
| CN | 103761729 | 4/2014 |

(Continued)

*Primary Examiner* — Gregory A Morse
*Assistant Examiner* — Stefano Anthony Dardano

(57) ABSTRACT

Provided is a dual-neighborhood wear angle automatic detection method, including constructing a proximal neighborhood and establishing grayscale differences between a pixel in a center area and pixels having first directions in the proximal neighborhood; calculating, based on the grayscale differences, deviation degrees of all pixels in the center area in the first directions; calculating a similar direction value based on the deviation degrees; constructing a distal neighborhood and focus pixels having second directions in the distal neighborhood; calculating grayscale differences between the pixel and the focus pixels; calculating deviation degrees of all pixels in the center area, in the second directions based on the grayscale differences between the pixel and the focus pixels; calculating a direction value of a wear angle based on the deviation degrees in the second directions; and calculating the wear angle based on the direction value of the wear angle.

12 Claims, 2 Drawing Sheets

(56) References Cited

FOREIGN PATENT DOCUMENTS

| | | | | |
|---|---|---|---|---|
| CN | 103761729 A | * | 4/2014 | |
| CN | 105184792 | | 12/2015 | |
| CN | 106770296 | | 5/2017 | |
| CN | 106770296 A | * | 5/2017 | ............ G01N 21/84 |
| CN | 107392899 | | 11/2017 | |
| CN | 111445438 | | 7/2020 | |

* cited by examiner

DUAL-NEIGHBORHOOD WEAR ANGLE AUTOMATIC DETECTION METHOD

CROSS-REFERENCE TO RELATED APPLICATIONS

The present application is a continuation of International Patent Application No. PCT/CN2021/071221, filed on Jan. 12, 2021, which claims priority to Chinese patent application NO. 202010121606.6, filed on Feb. 26, 2020, the entire contents of which are incorporated herein by their references.

FIELD

The present disclosure relates to an extended application of a four-ball friction tester for testing lubricating performances of a lubricant, and in particular, to a method for positioning a wear angle automatically by using pixels in dual neighborhoods.

BACKGROUND

Lubricants with good lubricity can protect machines and prolong service lives of machines, and are often tested by a four-ball wear tester. According to China Petroleum and Chemical Industrial Standards (GB-T 12583-1998 and H-T 0762-2005), a determination method of wear resistance performance of a lubricant is as follows. Three steel balls each with a diameter of 12.7 mm are clamped and immersed with test oil in an oil box; a steel ball of the same diameter is placed on the top of the three balls; after a temperature of the test oil reaches 75° C.±2° C., a force of 147 N or 392 N is applied and the ball on the top rotates at a certain speed for 60 mins; and then, the three steel balls at the bottom are taken out, and placed under a microscope with a measurement accuracy of 0.01 mm for measuring diameters of wear scars of the three steel balls. Six sets of measurement data are obtained from the three steel balls, the wear resistance performance of the lubricant or grease is evaluated by an arithmetic average of the diameters of the wear scars obtained from six measurements of the three balls. The determination of a n direction can facilitate measurement of the diameter of the wear scars, an adjustment of a shooting angle of a wear scar image, and subsequent analysis and processing of wear intensity, density etc. Based on this, a dual-neighborhood wear angle automatic detection method is provided.

SUMMARY

An object of the present disclosure is to provide a dual-neighborhood wear angle automatic detection method, which solves a defect of low measurement accuracy due to a perception error of testing personnel in an existing wear angle measurement method.

In order to achieve the above object, the present disclosure adopts the following technical solutions.

The present disclosure provides a dual-neighborhood wear angle automatic detection method. The method includes:

step 1: performing a gray processing on a captured wear scar image to obtain a grayed wear scar image;

step 2: choosing a pixel arbitrarily in a defined center area of the grayed wear scar image obtained in step 1, and constructing a proximal neighborhood above the pixel;

step 3: calculating grayscale differences between the arbitrarily chosen pixel and pixels having first directions on a boundary of the proximal neighborhood;

step 4: calculating deviation degrees of all pixels in the defined central area in the first directions based on the grayscale differences obtained in step 3;

step 5: calculating a similar direction value based on the deviation degrees obtained in step 4;

step 6: constructing a distal neighborhood of the arbitrarily chosen pixel chosen in step 2, and constructing focus pixels having second directions on a boundary of the distal neighborhood based on the similar direction value obtained in step 5;

step 7: calculating grayscale differences between the arbitrarily chosen pixel and the focus pixels constructed in step 6;

step 8: calculating deviation degrees of said all pixels of the defined center area in the second directions based on the grayscale differences obtained in step 7;

step 9: calculating a direction value of a wear angle based on the deviation degrees obtained in step 8; and step 10: calculating the wear angle based on the direction value of the wear angle obtained in step 9.

Preferably, the grayed wear scar image is a rectangular area having M pixel rows and N pixel columns; the defined center area refers to a rectangular area from a [0.25M]-th pixel row to a [0.75M]-th pixel row and from a [0.25M]-th pixel column to a [0.75M]-th pixel column of the graved wear scar image; the constructed proximal neighborhood is a rectangular area having a width of w pixels in a column direction of the grayed wear scar image and a length of 2w pixels in a row direction of th e grayed wear scar image; the arbitrarily chosen pixel is located in an i-th pixel row and j-th pixel column of the grayed wear scar image and the pixels having the first directions on the boundary of the proximal neighborhood satisfy any of following formulas:

$$\{(k,l)|i-w \leq k \leq i \text{ and } l=j+w\};$$

$$\{(k,l)|i-w \leq k < i \text{ and } i=j-w\}; \text{ and}$$

$$\{(k,l)|k=i-w \text{ and } j-w \leq l \leq j+w\},$$

where (k,l) represents a pixel haring a first direction on the boundary of the proximal neighborhood and located in a k-th pixel row and an l-th pixel column of the grayed wear scar image.

Preferably, in step 3, said calculating the grayscale differences between the arbitrarily chosen pixel and the pixels having the first directions on the boundary of the proximal neighborhood comprises:

on the constructed proximal neighborhood, sequentially and counterclockwise marking values of the first directions of the pixels on the boundary of the proximal neighborhood as 1, 2, . . . , 4w by taking a pixel (i,j+w) as a starting point; and calculating grayscale differences between the arbitrarily chosen pixel and the pixels having the first directions on the boundary of the proximal neighborhood in accordance with a following calculation formula:

$$d(i, j, \alpha) = \begin{cases} |f(i, j) - f_w(i, j, \alpha)| &, [0.25 \cdot M] \leq i \leq [0.75 \cdot M] \text{ and} \\ & [0.25 \cdot N] \leq j \leq [0.75 \cdot N] \\ 0 &, \text{else} \end{cases},$$

where α represents a value of a first direction, f(i,j) represents a grayscale value of the arbitrarily chosen pixel in the defined central region, $f_w$(i,j,α) represents a grayscale value of a pixel having the first direction on the boundary of the proximal neighborhood, d(i,j,α) represents α grayscale difference between the arbitrarily chosen pixel and the pixel having the first direction on the boundary of the proximal neighborhood in accordance, and [ ] represents a decimal rounding operation.

Preferably, in step 4, said calculating the deviation degrees of said all pixels in the defined center area in the first directions based on the grayscale differences obtained in step 3 comprises:

setting the deviation degrees of said all pixels in the defined center area in the first directions as average values in the first directions of the grayscale differences obtained in step 3, and calculating the average values in accordance with a following formula:

$$h(\alpha) = \frac{1}{N'} \sum_{i=[0.25M]}^{[0.75M]} \sum_{j=[0.25N]}^{0.75N} d(i, j, \alpha),$$

where α represents a value of a first direction, h(α) represents a deviation degree of pixels of the defined central region in the first direction, and N' represents a total number of pixels in the defined center area.

Preferably, in step 5, the similar direction value is calculated based on the deviation degrees obtained in step 4 in accordance with a following formula:

$$\alpha^* = \operatorname*{argmin}_{\alpha}(h(\alpha)),$$

where α* represents the direction value.

Preferably, in step 6, the constructed distal neighborhood is a rectangular area having a width of W pixels in the column direction of the grayed wear scar image and a length of 2W pixels in the row direction of the grayed wear scar image, and the focus pixels having the second directions on the boundary of the distal neighborhood satisfy any of following formulas:

{(K,L)|i−W≤K≤i and L=j+W};

{(K,L)|i−W≤K<i and L=j−W}; and

{(K,L)|K=i−W and j−W≤L≤j+W}, where (K,L) represents a focus pixel having a second direction on the boundary of the distal neighborhood and located in a K-th pixel row and an L-th pixel column of the grayed wear scar image wherein said constructing the focus pixels having the second directions on the boundary of the distal neighborhood based on the similar direction value obtained in step 5 comprises:

determining pixels on a boundary box of the distal neighborhood that correspond to the similar direction value as the focus pixels having the second directions on the boundary of the distal neighborhood, wherein values of the second directions of the focus pixels satisfy:

$$\left[\frac{\alpha^* - 1}{w} \cdot W\right] \le \beta \le \left[\frac{\alpha^* + 1}{w} \cdot W\right],$$

where w<W≤40; and β represents a value of a second direction of a focus pixel on the boundary box of the distal neighborhood, and is an integer.

Preferably, in step 7, said calculating the gray scale differences between the arbitrarily chosen pixel and the focus pixels constructed in step 6 comprises:

on the constructed distal neighborhood, sequentially and counterclockwise marking the values of the second directions of the focus pixels on the boundary of the distal neighborhood as 1, 2, . . . , 4W by taking a pixel (i,j+W) as a starting point, and calculating the grayscale differences between the arbitrarily chosen pixel and the focus pixels constructed in step 6 in accordance with a following formula:

$$e(i, j, \beta) = \begin{cases} |f(i, j) - f_w(i, j, \beta)| &, \text{if } [0.25 \cdot M] \le i \le [0.75 \cdot M] \text{ and} \\ & [0.25 \cdot N] \le j \le [0.75 \cdot N] \\ 0 &, \text{else} \end{cases},$$

where β represents a value of a second direction, f(i,j) represents a gray scale value of the arbitrarily chosen pixel in the defined central region, $f_w$(i,j,β) represents a grayscale value of a focus pixel having the second direction on the boundary of the distal neighborhood, and e(i,j,β) represents a grayscale difference between the arbitrarily chosen pixel and the focus pixel having the second direction on the boundary of the distal neighborhood.

Preferably, in step 8, said calculating the deviation degrees of said all pixels of the defined center area in the second directions based on the grayscale differences obtained in step 7 is performed in accordance with a following formula:

$$g(\beta) = \sum_{i=[0.25M]}^{[0.75M]} \sum_{j=[0.25N]}^{0.74N} e(i,j,\beta),$$

where β represents a value of a second direction, and g(β) represents a deviation degree of pixels in the defined center area in the second direction.

Preferably, in step 9, the direction value of the wear angle is calculated based on the deviation degrees obtained in step 8 in accordance with a following formula:

$$\beta^* = \operatorname*{argmin}_{\beta}(g(\beta)),$$

where β* represents the direction value of the wear angle.

Preferably, in step 10, said calculating the wear angle based on the direction value of the wear angle obtained in step 9 is performed in accordance with a following formula:

$$\theta = \begin{cases} \arctan\left(\frac{Y}{W}\right) &, \text{if } Z = 0 \\ \arctan\left(\frac{W}{W - Y}\right) &, \text{if } Z = 1 \\ 90° &, \text{if } Z = 2 \text{ and } Y = 0 \\ 180° - \arctan\left(-\frac{W}{Y}\right) &, \text{else} \end{cases}$$

where θ represents the wear angle, Z represents a quotient of $$\frac{\beta^* - 1}{W},$$

which is an integer, and a value of Z is 0, 1, 2, or 3; and Y represents a remainder of $$\frac{\beta^* - 1}{W},$$

which is an integer, and a value of Y is 0, 1, 2, . . . , or W.

Compared with the related art, the present disclosure can provide the following beneficial effects.

The present disclosure provides a dual-neighborhood wear angle automatic detection method, which includes: constructing a small-sized proximal neighborhood and establishing grayscale differences between a pixel in a center area and pixels having first directions in the proximal neighborhood; calculating, based on the grayscale differences, deviation degrees of all pixels in the center area in the first directions; calculating a similar direction value based on the deviation degrees; construction a large-sized distal neighborhood and focus pixels having second directions corresponding to the similar direction value in the distal neighborhood, calculating grayscale differences between the pixel and the focus pixels; calculating deviation degrees of all pixels in the center area in the second directions based on the grayscale differences between the pixel and the focus pixels; calculating a direction value of a wear angle based on the deviation degrees in the second directions; and calculating the wear angle base on the direction value of the wear angle and a size of the distal neighborhood. This method has high detection accuracy and short running time. This method has high detection accuracy and short running time.

DESCRIPTION OF EMBODIMENTS

The present disclosure will be further described in detail below with reference to the accompanying drawings.

Figure 1:
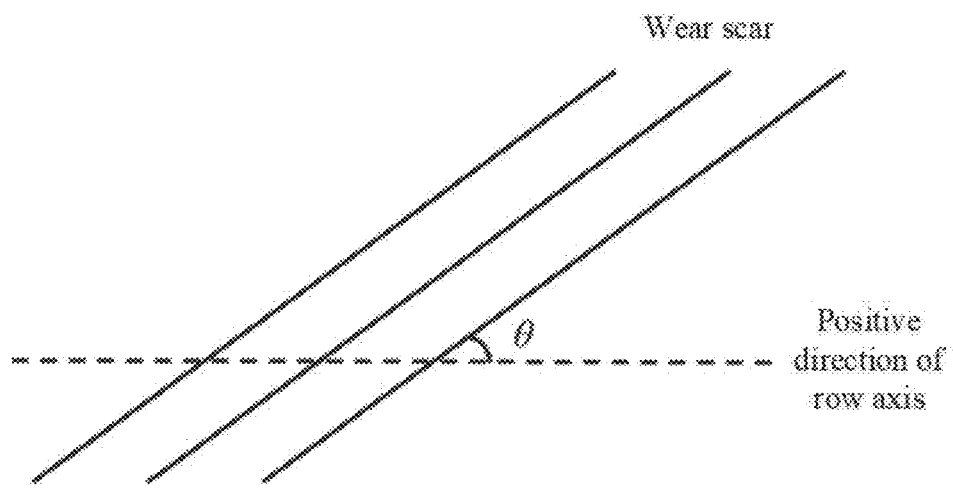
FIG. 1 illustrates a schematic diagram of a wear angle θ.

In the present disclosure, a wear angle is used to characterize a wear direction. The wear angle is defined as a smallest positive angle that a wear scar rotates clockwise to a positive direction of a row axis, and is represented by b θ. A schematic diagram of the wear angle θ is illustrated in FIG. 1.

The present disclosure provides a dual-neighborhood wear angle automatic detection method. The method includes the to steps.

Figure 2:
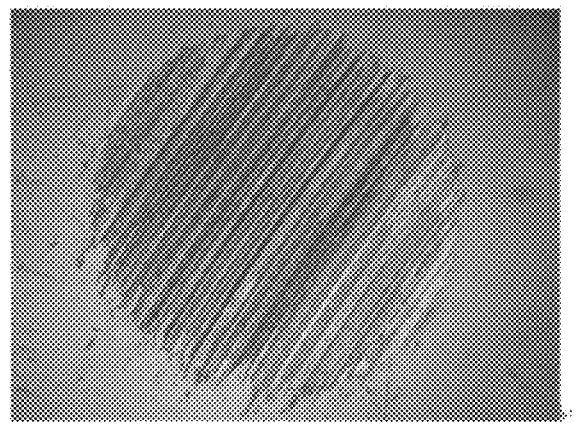
FIG. 2 illustrates a schematic diagram of a wear scar image F.

In step 1, a wear scar image of a test steel ball is collected by a scanning electron microscope. Specifically after a four-ball friction test is finished, the teat steel ball is taken out and placed under the scanning electron microscope, and parameters such as illumination and magnification of the scanning electron microscope are adjusted to collect a clear wear scar image. The collected wear scar image is denoted by F. A site of the obtained wear scar image F where M×N represents a total number of pixel rows of the wear scar image F and N represents a total number of pixel columns of the wear scar image F, i.e., the grayed wear scar image is a rectangular area having M pixel rows and N pixel columns (i, j) represents coordinates of any pixel in the wear scar image where i represents a row value of the pixel, j represents a column value of the pixel, and i and j are integers that satisfy $1 \leq i \leq M$ and $1 \leq j \leq N$. In other words, pixel (i, j) refers to a pixel located in an i-th pixel row and j-th pixel column In an embodiment, the wear sear image F is illustrated in FIG. 2, and the size of the wear scar image F is 768×1,024, i.e., M=768 and N=1,024.

In step 2, a gray processing is performed on the collected wear scar image. Since the wear scar image collected in step 1 does not have significant color information, the gray processing needs to be performed on the wear scar image to increase a processing speed. Taking into account different sensitivities of human eyes to colors, the gray processing is performed on the wear scar image F based on a weighted average method to obtain a grayed wear scar image. The grayed wear scar image is denoted by f. A process of the gray processing on the wear scar image is performed in accordance with a formula (1):

$$f(i,j)=0.3 \cdot R(i,j)+0.59 \cdot G(i,j)+0.11 \cdot B(i,j) \qquad (1).$$

where f(i, j) represents a grayscale value of a pixel (i, j) in the grayed wear scar image f; and R(i, j), G(i, j) and B(i, j) represent red, green, and blue component values of the pixel (i, j) in the wear scar image F, respectively.

Figure 3:
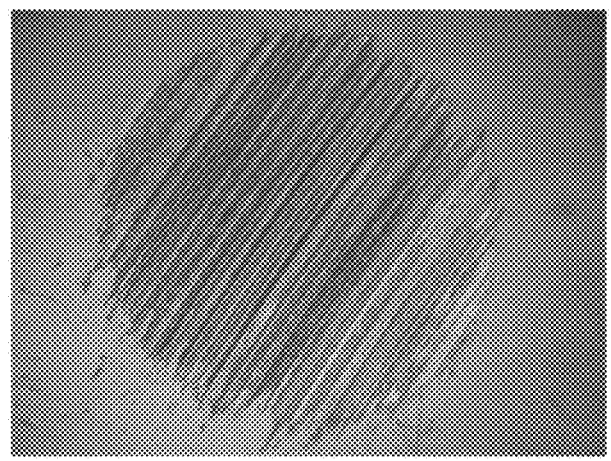
FIG. 3 illustrates a schematic diagram of a grayed wear scar image f.

In an embodiment, the grayed wear scar image is illustrated in FIG. 3.

In step 3, a proximal neighborhood of a pixel is constructed. Since grayscale values of all pixels in the wear direction in the grayed wear scar image f obtained in step 2 are similar, grayscale differences between a certain pixel and pixels in the proximal neighborhood of the pixel are used to characterize a grayscale similarity of wear scars.

Figure 4:
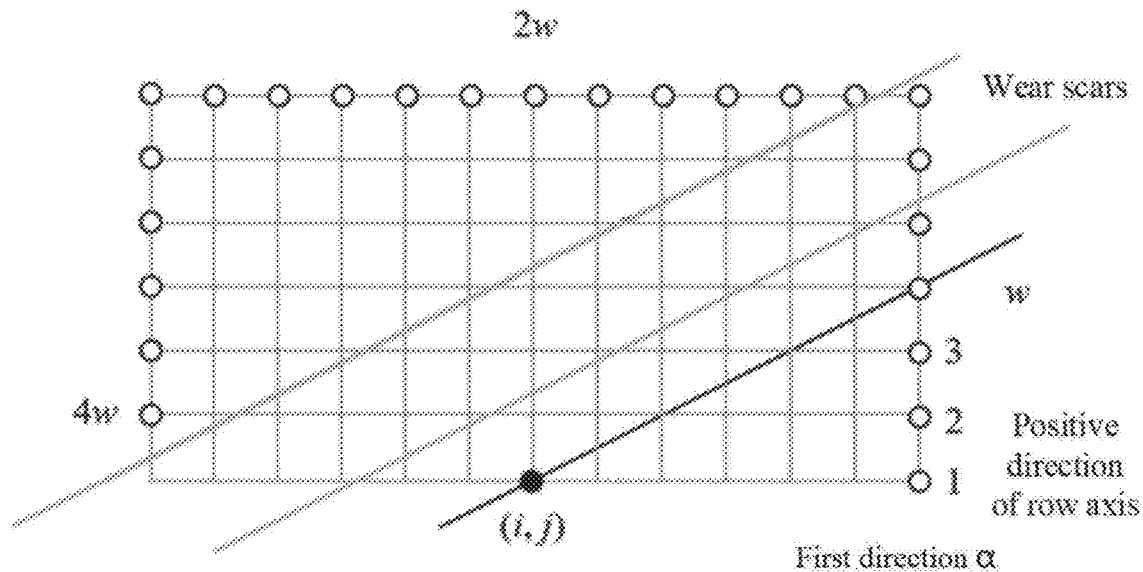
FIG. 4 illustrates a proximal neighborhood and pixels in the proximal neighborhood.

Specifically, taking a pixel as a unit of measurement, a pixel (i, j) is chosen arbitrarily from a defined center area of the graved near scar image f obtained in step 2, the defined center area refers to a rectangular area from a [0.25M]-th pixel row to a [0.75M]-th pixel row and from a [0.25M]-th pixel column to a [0.75M]-th pixel column of the grayed wear scar image, a proximal neighborhood (as illustrated in FIG. 4) with a site of (w×2w) is constructed above the pixel, i.e. a rectangular area having a width of w pixels in a column direction and a length of 2w pixels in a row direction, and the pixels of the constructed proximal neighborhood refer to a set of pixels on a boundary of the proximal neighborhood, coordinates of which satisfy an of formulas (2) to (4):

$$\{(k,l) | i-w \leq k \leq i \text{ and } l=j+w\} \qquad (2),$$

$$\{(k,l) | i-w \leq k < i \text{ and } i=j-w\} \qquad (3); \text{ and}$$

$$\{(k,l) | k=i-w \text{ and } j-w \leq l \leq j+w\} \qquad (4)$$

where an appropriate value of is 6 to 12; a number of elements (i.e., pixels) in the set of pixels of the proximal neighborhood is 4w; and (k,l) represents a pixel in the set of pixels on the boundary of the proximal neighborhood and located in a k-th pixel row and an l-th pixel column of the grayed wear scar image.

In an embodiment, the value of w is 10, and the number of elements (i.e., pixels) in the set of pixels of the proximal neighborhood is 40.

In step 4, bra scale differences between the arbitrarily chosen pixel and the pixels in the proximal neighborhood of the pixel are calculated.

Considering that insufficient wear information around the wear scar image max interfere with a result of subsequent processing, a grayscale difference calculation is only performed on a central region of the image. In order to avoid cumbersome angle calculations, numerical numbers are used to mark directions of the pixels in the proximal neighborhood. Starting from a pixel (i, j+w), values of the direction (hereinafter referred to as first directions) of the pixels in the proximal neighborhood are marked counterclockwise sequentially as 1, 2, . . . , 4w.

The grayscale differences between the arbitrarily chosen pixel and the pixels having the first directions on the boundary of the proximal neighborhood are calculated in accordance with a following calculation formula.

$$d(i, j, \alpha) = \begin{cases} |f(i, j) - f_w(i, j, \alpha)|, & \text{if } [0.25 \cdot M] \le i \le [0.75 \cdot M] \text{ and} \\ & [0.25 \cdot N] \le j \le [0.75 \cdot N] \\ 0, & \text{else} \end{cases} \quad (5)$$

where α represents a value of a first direction, f(i, j) represents a grayscale value of the arbitrarily chosen pixel in the defined central region, $f_w(i,j,\alpha)$ represents a grayscale value of a pixel having the first direction on the boundary of the proximal neighborhood d(i,j,α) represents a grayscale difference between the arbitrarily chosen pixel and the pixel having the first direction on the boundary of the proximal neighborhood, and [ ] represents a decimal rounding operation. Each pixel in the proximal neighborhood corresponds to one direction value, and α=1, 2, . . . , 4w.

In an embodiment, n is 10, so the pixel (i, j) can give grayscale differences d(i,j,α) in 40 directions.

In step 5, deviation degrees of all pixels in the defined center area in the first directions are calculated. The deviation degrees of all pixels in the defined center area are defined as average values of the grayscale differences (step S4) of pixels in the defined central region in the first directions, and are indexes reflecting grayscale change amounts of the pixels in different directions.

$$h(\alpha) = \frac{1}{N'} \sum_{k=[0.25M]}^{[0.75M]} \sum_{j=[0.25N]}^{[0.75N]} d(i, j, \alpha), \quad (6)$$

where h(α) represents a deviation degree of pixels in the defined central region in a first direction.

In an embodiment, the deviation degrees of the pixels in the defined central region in the first directions are illustrated in Table 1. N' represents a total number of pixels of the defined central region, and is calculated in accordance with a formula (7):

$$N'=([0.75M]-[0.25M]+1)([0.75N]-[0.25N]+1) \quad (7).$$

TABLE 1

| Deviation degrees of pixels in the defined center area | | | | | | | |
|---|---|---|---|---|---|---|---|
| a | 1 | 2 | 3 | 4 | 5 | 6 | 7 | 8 |
| h(a) | 12387.1 | 12206.2 | 12031.8 | 11919.5 | 11890 | 11886.7 | 11867.8 | 11802.4 |
| a | 9 | 10 | 11 | 12 | 13 | 14 | 15 | 16 |
| h(a) | 11685.5 | 11508.5 | 11144 | 9868.4 | 7570.4 | 5594.2 | 6910.8 | 9426.2 |
| a | 17 | 18 | 19 | 20 | 21 | 22 | 23 | 24 |
| h(a) | 10934.7 | 11442.2 | 11612.2 | 11749.1 | 11827.7 | 11908.4 | 12062.3 | 12318.7 |
| a | 25 | 26 | 27 | 28 | 29 | 30 | 31 | 32 |
| h(a) | 12462.7 | 12406.2 | 12305.5 | 12318 | 12440.8 | 12618.6 | 12838.2 | 12685.6 |
| a | 33 | 34 | 35 | 36 | 37 | 38 | 39 | 40 |
| h(a) | 12542.8 | 12446.9 | 12378.8 | 12341 | 12361.1 | 12429.5 | 12504.4 | 12507.4 |

In step 6, a similar direction value is calculated. A minimum deviation degree represents that grayscales of pixels in a first direction are closest to each other, and a value of the first direction corresponding to the minimum deviation degree is the similar direction value, which can be used in subsequent calculation of the wear angle:

$$\alpha^* = \underset{\alpha}{\arg\min}(h(\alpha)), \quad (8)$$

where α* represents the similar direction value.

In an embodiment, α* is 14, and j(α*)=229564.2. h(α) represents the minimum deviation degree.

In step 7, a distal neighborhood and focus pixels in to distal neighborhood are constructed. The similar direction value obtained in step S6 basically determines a value range of the near angle. However, since the size of the proximal neighborhood is relatively small, and a relatively few directions can be observed, accuracy of calculation of the wear angle directly with the direction obtained by using the proximal neighborhood is not high enough, and thus it is necessary to choose a large-sized distal neighborhood having a sue of W×2W to improve measurement accuracy of the wear angle. The size of W×2W refers to a rectangular area having, a width of W pixels in the column direction of the grayed wear scar image and a length of 2W pixels in the row direction of the grayed near scar image. The focus pixels of the distal neighborhood refer to a set of pixels on a boundary of the distal neighborhood, coordinates of which satisfy any of following formulas:

{(K,L)|i−W≤K≤i and L=j+W};

{(K,L)|−W≤K<i and L=j−W}; and

{(K,L)|K=i−W and j−W≤L≤j+W}, where (K,L) represents a focus pixel having a second direction on the boundary of the distal neighborhood and located in a K-th pixel row and an L-th pixel column of the grayed wear scar image.

Figure 5:
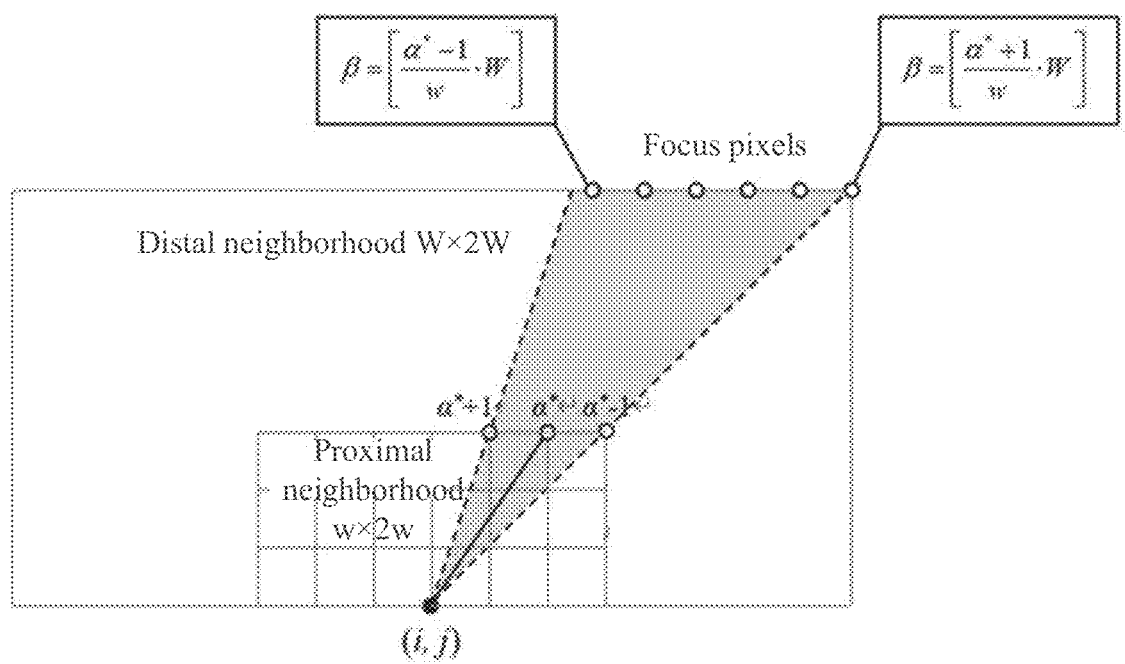
FIG. 5 illustrates a distal neighborhood and focus pixels.

In addition, to minimize an amount of calculations, only focus pixels on the boundary of the distal neighborhood are processed. The focus pixels are defined as pixels corresponding to the similar direction value on a boundary box of the distal neighborhood. The distal neighborhood and the focus pixels are illustrated in FIG. 5. Values of directions (hereinafter referred to as second directions) of the torus pixels satisfy:

$$\left[\frac{\alpha^* - 1}{w} \cdot W\right] \le \beta \le \left[\frac{\alpha^* + 1}{w} \cdot W\right], \quad (9)$$

where w≤W≤40w, and β represents a value of a second direction of a focus pixel in the distal neighborhood, and is an integer. In an embodiment, a value of W is 25, and values ops are 33, 34, 35, 36, 37, and 38.

In step 8, grayscale differences between the arbitrarily chosen pixel and the focus pixels in the distal neighborhood are calculated.

$$e(i, j, \beta) = \begin{cases} |f(i, j) - f_W(i, j, \beta)|, & \text{if } [0.25M] \le i \le [0.75M] \text{ and } [0.25N] \le j \le [0.75N] \\ 0, & \text{else} \end{cases} \quad (10)$$

where β represents a value of a second direction, f(i, j) represents a grayscale value of the arbitrarily chosen pixel in the defined central region, $f_w(i,j,\beta)$ represents a grayscale value of a focus pixel having the second direction on the boundary of the distal neighborhood, and e(i,j,β) represents a grayscale difference between the arbitrarily chosen pixel and the focus pixel having the second direction on the boundary of the distal neighborhood.

In step 9, deviation degrees of all pixels of the defined center area in the second directions are calculated. Similar to a principle of the deviation degrees of the pixels in the defined center area in the first directions (step 5), the deviation degrees of all pixels in the defined center area in the second directions are calculated based on the grayscale differences of the focus pixels in the distal neighborhood (step 8):

$$g(\beta) = \Sigma_{i=[0.25M]}^{[0.75M]} \Sigma_{j=[0.25N]}^{0.75N} e(i,j,\beta) \quad (11),$$

β represents a value of a second direction, and g(β) represents a deviation degree of pixels in the defined center area in the second direction.

In an embodiment, the deviation degrees of the pixels of the defined center area are illustrated in Table 2.

TABLE 2

| Deviation degrees of pixels in the defined center area | | | | | |
|---|---|---|---|---|---|
| β | 33 | 34 | 35 | 36 | 37 | 38 |
| g(β) | 8232.6 | 7563.6 | 8736.6 | 10653.9 | 11791.3 | 12152.9 |

In step 10, a direction value of a wear angle is calculated. Along the wear direction, when the grayscale difference of the pixels in a second direction is the smallest, and a value of the deviation degree in the second direction is also the smallest. The value of the second direction corresponds to the wear angle $$\beta^* = \underset{\beta}{\operatorname{argmin}}(g(\beta)), \quad (12)$$

where β represents the direction value of the wear angle.

In an embodiment, the direction value of the wear angle, β* is 34.

In step 11, the wear angle is calculated. The wear angle can be calculated based on the direction value of the wear angle and the site of the distal neighborhood;

$$\theta = \begin{cases} \arctan\left(\frac{Y}{W}\right), & \text{if } Z = 0 \\ \arctan\left(\frac{W}{W - Y}\right), & \text{if } Z = 1 \\ 90°, & \text{if } Z = 2 \text{ and } Y = 0 \\ 180° - \arctan\left(-\frac{W}{Y}\right), & \text{else} \end{cases} \quad (13)$$

where θ represents the angle, Z represents a quotient of $$\frac{\beta^* - 1}{W},$$

which is an integer, and a value of Z is 0, 1, 2, or 3; and Y represents a remainder of $$\frac{\beta^* - 1}{W},$$

which is an integer, and a value of Y is 0, 1, 2, . . . , W.

In an embodiment, the wear angle, θ is 55.8°.

According to the above technical solution of the present disclosure, advantages of the solutions of the present disclosure were analyzed in terms of running time and detection accuracy analysis.

1. Running time. A simulation processing platform of the present disclosure was an Intel I3 M350 processor and a computer with 2 GB memory. 200 samples were simulated and tested under a MATLAB platform. The algorithm takes 2.8 s. After hardware implemented the algorithm, the running time of the algorithm was greatly reduced.

2. Detection accuracy analysis. In order to verify effectiveness of the algorithm, the detection accuracy was characterized by an absolute error ξ which was defined as an absolute value of a difference between a detected wear angle and an actual wear angle. The actual wear angle was manually calibrated. After verification of data of 200 samples, an average absolute error was 1.9°. Therefore, the algorithm has high detection accuracy and good robustness.

What is claimed is:

1. A dual-neighborhood wear angle automatic detection method for a four-ball friction tester, comprising:
   step 1: capturing a wear scar image of a test steel ball by an electron microscope and performing a gray processing on the captured wear scar image of the test steel ball to obtain a grayed wear scar image of the test steel ball;
   step 2: choosing a pixel arbitrarily in a defined center area of the grayed wear scar image of the test steel ball obtained in step 1, and constructing a proximal neighborhood above the pixel;

step 3: calculating grayscale differences between the arbitrarily chosen pixel and pixels having first directions on a boundary of the proximal neighborhood;

step 4: calculating deviation degrees of all pixels in the defined central area in the first directions based on the grayscale differences obtained in step 3;

step 5: calculating a similar direction value based on the deviation degrees obtained in step 4;

step 6: constructing a distal neighborhood of the arbitrarily chosen pixel chosen in step 2, and constructing focus pixels having second directions on a boundary of the distal neighborhood based on the similar direction value obtained in step 5;

step 7: calculating grayscale differences between the arbitrarily chosen pixel and the focus pixels constructed in step 6;

step 8: calculating deviation degrees of said all pixels of the defined center area in the second directions based on the grayscale differences obtained in step 7;

step 9: calculating a direction value of a wear angle of the test steel ball based on the deviation degrees obtained in step 8; and step 10: calculating the wear angle of the test steel ball based on the direction value of the wear angle of the test steel ball obtained in step 9.

2. The dual-neighborhood wear angle automatic detection method for the four-ball friction tester according to claim 1, wherein the grayed wear scar image is a rectangular area having M pixel rows and N pixel columns; the defined center area refers to a rectangular area from a [0.25M]-th pixel row to a [0.75M]-th pixel row and from a [0.25M]-th pixel column to a [0.75M]-th pixel column of the grayed wear scar image; the constructed proximal neighborhood is a rectangular area having a width of w pixels in a column direction of the grayed wear scar image and a length of 2w pixels in a row direction of the grayed wear scar image; the arbitrarily chosen pixel is located in an i-th pixel row and a j-th pixel column of the grayed wear scar image and the pixels having the first directions on the boundary of the proximal neighborhood satisfy any of following formulas:

$$\{(k,l)|i-w \leq k \leq i \text{ and } l=j+w\};$$

$$\{(k,l)|i-w \leq k < i \text{ and } i=j-w\}; \text{ and}$$

$$\{(k,l)|k=i-w \text{ and } j-w \leq l \leq j+w\},$$

where (k,l) represents a pixel having a first direction on the boundary of the proximal neighborhood and located in a k-th pixel row and an l-th pixel column of the grayed wear scar image.

3. The dual-neighborhood wear angle automatic detection method for the four-ball friction tester according to claim 2, wherein in step 3, said calculating the grayscale differences between the arbitrarily chosen pixel and the pixels having the first directions on the boundary of the proximal neighborhood comprises:

on the constructed proximal neighborhood, sequentially and counterclockwise marking values of the first directions of the pixels on the boundary of the proximal neighborhood as 1, 2, ..., 4w by taking a pixel (i,j+w) as a starting point; and calculating grayscale differences between the arbitrarily chosen pixel and the pixels having the first directions on the boundary of the proximal neighborhood in accordance with a following calculation formula:

$$d(i, j, \alpha) = \begin{cases} |f(i,j) - f_W(i, j, \alpha)|, & [0.25 \cdot M] \leq i \leq [0.75 \cdot M] \text{ and } [0.25 \cdot N] \leq j \leq [0.75 \cdot N] \\ 0, & \text{else} \end{cases},$$

where $\alpha$ represents a value of a first direction, $f(i, j)$ represents a grayscale value of the arbitrarily chosen pixel in the defined central region, $f_w(i,j,\alpha)$ represents a grayscale value of a pixel having the first direction on the boundary of the proximal neighborhood, $d(i,j,\alpha)$ represents a grayscale difference between the arbitrarily chosen pixel and the pixel having the first direction on the boundary of the proximal neighborhood, and [ ] represents a decimal rounding operation.

4. The dual-neighborhood wear angle automatic detection method for the four-ball friction tester according to claim 3, wherein in step 4, said calculating the deviation degrees of said all pixels in the defined center area in the first directions based on the grayscale differences obtained in step 3 comprises:

setting the deviation degrees of said all pixels in the defined center area in the first directions as average values in the first directions of the grayscale differences obtained in step 3, and calculating the average values in accordance with a following formula:

$$h(\alpha) = \frac{1}{N'} \sum_{i=[0.25M]}^{[0.75M]} \sum_{j=[0.25N]}^{0.75N} d(i, j, \alpha),$$

where $\alpha$ represents a value of a first direction, $h(\alpha)$ represents a deviation degree of pixels of the defined central region in the first direction, and N' represents a total number of pixels in the defined center area.

5. The dual-neighborhood wear angle automatic detection method for the four-ball friction tester according to claim 4, wherein in step 5, the similar direction value is calculated based on the deviation degrees obtained in step 4 in accordance with a following formula:

$$\alpha^* = \underset{\alpha}{\operatorname{argmin}}\,(h(\alpha))$$

Where, $\alpha^*$ represents the similar direction value.

6. The dual-neighborhood wear angle automatic detection method for the four-ball friction tester according to claim 5, wherein in step 6, the constructed distal neighborhood is a rectangular area having a width of W pixels in the column direction of the grayed wear scar image and a length of 2W pixels in the row direction of the grayed wear scar image, and the focus pixels having the second directions on the boundary of the distal neighborhood satisfy any of following formulas:

$$\{(K,L)|i-W \leq K \leq i \text{ and } L=j+W\};$$

$$\{(K,L)|i-W \leq K < i \text{ and } L=j-W\}; \text{ and}$$

$$\{(K,L)|K=i-W \text{ and } j-W \leq L \leq j+W\},$$

where (K,L) represents a focus pixel having a second direction on the boundary of the distal neighborhood and located in a K-th pixel row and an L-th pixel column of the grayed wear scar image;

wherein said constructing the focus pixels having the second directions on the boundary of the distal neighborhood based on the similar direction value obtained in step 5 comprises:

determining pixels on a boundary box of the distal neighborhood that correspond to the similar direction value as the focus pixels having the second directions on the boundary of the distal neighborhood, wherein values of the second directions of the focus pixels satisfy:

$$\left[\frac{\alpha^*-1}{w} \cdot W\right] \le \beta \le \left[\frac{\alpha^*+1}{w} \cdot W\right],$$

where w<W≤40; and β represents a value of a second direction of a focus pixel on the boundary box of the distal neighborhood, and is an integer.

7. The dual-neighborhood wear angle automatic detection method for the four-ball friction tester according to claim 6, wherein in step 7, said calculating the grayscale differences between the arbitrarily chosen pixel and the focus pixels constructed in step 6 comprises:

on the constructed distal neighborhood, sequentially and counterclockwise marking the values of the second directions of the focus pixels on the boundary of the distal neighborhood as 1, 2, . . . , 4W by taking a pixel (i, j+W) as a starting point; and calculating the grayscale differences between the arbitrarily chosen pixel and the focus pixels constructed in step 6 in accordance with a following formula:

$$e(i, j, \beta) = \begin{cases} |f(i, j) - f_W(i, j, \beta)|, & \text{if } [0.25 \cdot M] \le i \le [0.75 \cdot M] \text{ and } [0.25 \cdot N] \le j \le [0.75 \cdot N] \\ 0, & \text{else} \end{cases}$$

where β represents a value of a second direction, f(i, j) represents a grayscale value of the arbitrarily chosen pixel in the defined central region, $f_W(i,j,\beta)$ represents a grayscale value of a focus pixel having the second direction on the boundary of the distal neighborhood, and e(i,j,β) represents a grayscale difference between the arbitrarily chosen pixel and the focus pixel having the second direction on the boundary of the distal neighborhood.

8. The dual-neighborhood wear angle automatic detection method for the four-ball friction tester according to claim 7, wherein in step 8, said calculating the deviation degrees of said all pixels of the defined center area in the second directions based on the grayscale differences obtained in step 7 is performed in accordance with a following formula:

$$g(\beta) = \Sigma_{i=[0.25M]}^{[0.75M]} \Sigma_{j=[0.25N]}^{0.75N} e(i,j,\beta),$$

where β represents a value of a second direction, and g(β) represents a deviation degree of pixels in the defined center area in the second direction.

9. The dual-neighborhood wear angle automatic detection method for the four-ball friction tester according to claim 8, wherein, in step 9, the direction value of the wear angle is calculated based on the deviation degrees obtained in step 8 in accordance with a following formula:

$$\beta^* = \underset{\beta}{\mathrm{argmin}}\,(g(\beta),$$

where β* represents the direction value of the wear angle.

10. The dual-neighborhood wear angle automatic detection method for the four-ball friction tester according to claim 9, wherein in step 10, said calculating the wear angle based on the direction value of the wear angle obtained in step 9 is performed in accordance with a following formula:

$$\theta = \begin{cases} \arctan\left(\frac{Y}{W}\right), & \text{if } Z = 0 \\ \arctan\left(\frac{W}{W-Y}\right), & \text{if } Z = 1 \\ 90°, & \text{if } Z = 2 \text{ and } Y = 0 \\ 180° - \arctan\left(-\frac{W}{Y}\right), & \text{else} \end{cases}$$

where θ represents the wear angle, Z represents a quotient of $$\frac{\beta^*-1}{W},$$

which is an integer, and a value of Z is 0, 1, 2, or 3; and Y represents a remainder of $$\frac{\beta^*-1}{W},$$

which is an integer, and a value of Y is 0, 1, 2, . . . , or W.

11. The dual-neighborhood wear angle automatic detection method for the four-ball friction tester according to claim 1, wherein the calculated wear angle of the test steel ball is used in at least one of: measurement of a diameter of a wear scar of the test steel ball, an adjustment of a shooting angle of the wear scar image of the test steel ball, and subsequent analysis and processing of wear intensity and density of the test steel ball.

12. The dual-neighborhood wear angle automatic detection method for the four-ball friction tester according to claim 11, wherein a wear resistance performance of a lubricant or grease is evaluated by an arithmetic average of diameters of wear scars obtained from measurements of three balls at a bottom of the four-ball friction tester.

\* \* \* \* \*